(12) United States Patent
Takagi et al.

(10) Patent No.: US 8,075,829 B2
(45) Date of Patent: Dec. 13, 2011

(54) METHOD FOR DRYING HONEYCOMB FORMED ARTICLE

(75) Inventors: Shuichi Takagi, Nagoya (JP); Yasuhiro Horiba, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 186 days.

(21) Appl. No.: 12/537,598

(22) Filed: Aug. 7, 2009

(65) Prior Publication Data

US 2010/0078859 A1 Apr. 1, 2010

(30) Foreign Application Priority Data

Sep. 26, 2008 (JP) .................................. 2008-248899

(51) Int. Cl.
*H05B 6/64* (2006.01)
*C04B 35/622* (2006.01)

(52) U.S. Cl. .................. 264/432; 264/631; 264/177.12; 156/89.22; 34/259

(58) Field of Classification Search .................. 264/430, 264/432, 434, 630–631, 177.12; 156/89.22; 34/259
See application file for complete search history.

(56) References Cited

U.S. PATENT DOCUMENTS

| | | | |
|---|---|---|---|
| 5,263,263 A | 11/1993 | Gheorghiu et al. | |
| 5,513,447 A | 5/1996 | Yoshida | |
| 5,538,681 A * | 7/1996 | Wu | 264/432 |
| 5,543,096 A | 8/1996 | Wu | |
| 7,320,183 B2 * | 1/2008 | Ishii et al. | 34/429 |
| 7,721,461 B2 * | 5/2010 | Ishii et al. | 34/265 |
| 7,862,764 B2 * | 1/2011 | Feldman et al. | 264/430 |
| 2002/0093123 A1 | 7/2002 | Miura et al. | |
| 2003/0102602 A1 | 6/2003 | Miura | |
| 2004/0235659 A1 * | 11/2004 | Abe et al. | 502/439 |
| 2007/0006480 A1 * | 1/2007 | Ishii et al. | 34/265 |
| 2009/0146350 A1 * | 6/2009 | Noguchi et al. | 264/630 |
| 2010/0078859 A1 * | 4/2010 | Takagi et al. | 264/432 |
| 2010/0129600 A1 * | 5/2010 | Lu et al. | 428/116 |
| 2010/0135866 A1 * | 6/2010 | Mizuno et al. | 422/180 |
| 2010/0151185 A1 * | 6/2010 | Okazaki | 428/116 |

(Continued)

FOREIGN PATENT DOCUMENTS

DE 195 08 012 A1 9/1995

(Continued)

OTHER PUBLICATIONS http://home.fuse.net/clymer/water/wet.html (this is used for converting wet bulb and dry bulb and finding relative humidity).*

(Continued)

*Primary Examiner* — Joseph Del Sole
*Assistant Examiner* — Nahida Sultana
(74) *Attorney, Agent, or Firm* — Oliff & Berridge PLC

(57) ABSTRACT

There is provided a method for drying a honeycomb formed article 1. The method has the first step, where an unfired honeycomb formed article 1 having a plurality of cells separated by partition walls made from raw material composition containing a ceramic raw material, water, and a binder is heated and dried by microwave drying or dielectric drying, and a second step, where the honeycomb formed article 1 is dried by hot air drying, where hot air whose humidity was adjusted to have a wet-bulb temperature of 50 to 100° C. using a hot air drying apparatus 11 after the first step is passed through the cells. The method can dry a honeycomb formed article in a shorter period of time with inhibiting generation of a defect such as a deformation or breakage.

16 Claims, 4 Drawing Sheets

U.S. PATENT DOCUMENTS

2010/0156010 A1* 6/2010 Merkel .................. 264/628
2010/0216634 A1* 8/2010 Ohno et al. ............ 502/332

FOREIGN PATENT DOCUMENTS

| DE | 10 2007 000 573 A1 | | 5/2008 |
|---|---|---|---|
| DE | 200710000573 | * | 8/2008 |
| JP | A-4-31372 | | 2/1992 |
| JP | A-6-298563 | | 10/1994 |
| JP | A-2002-283329 | | 10/2002 |
| JP | A-2002-283330 | | 10/2002 |
| JP | A-2003-170413 | | 6/2003 |
| JP | A-2005-216599 | | 8/2005 |
| WO | WO 2005/023503 A1 | | 3/2005 |

OTHER PUBLICATIONS

Http://en.wikipedia.org/wiki/wet-bulb_temperature) for definition of wet bulb.*

European Search Report dated Feb. 14, 2011 in European Patent Application No. 09252114.5.

* cited by examiner

METHOD FOR DRYING HONEYCOMB FORMED ARTICLE

BACKGROUND OF THE INVENTION AND RELATED ART STATEMENT

The present invention relates to a method for drying a honeycomb formed article.

A honeycomb structure is widely used for a catalyst carrier, various filters, and the like. Recently, a honeycomb structure has been attracting attention as a diesel particulate filter (DPF) for trapping particulate matter discharged from a diesel engine.

A honeycomb structure generally employs ceramic as the main component. Such a honeycomb structure is manufactured by adding water and various kinds of additives such as a binder to a ceramic raw material to prepare kneaded clay in the first place and subjecting the kneaded clay to extrusion forming to manufacture a honeycomb-shaped formed article (honeycomb formed article). A honeycomb structure can be manufactured by drying and firing the honeycomb formed article.

The honeycomb formed article can be dried by a drying method using microwaves having an advantage of high drying speed and the like (microwave drying method), a dielectric drying method using high-frequency energy generated by applying current between electrodes provided on the upper and the lower sides of the honeycomb formed article, or hot air drying method where drying is performed by introducing hot air generated by a gas burner or the like, alone or in combination of them (see, e.g., JP-A-2002-283329, JP-A-2002-283330, and WO No. 2005/023503).

However, in the microwave drying method, there is a case having difficulty in drying the whole honeycomb formed article at uniform speed because drying in the upper and lower end portions and the outer peripheral portion is behind in comparison with the other portions of the honeycomb formed article in the drying process. Since the honeycomb formed article shrinks due to evaporation of water, when the drying speed is not uniform, a defect such as a deformation and breakage is easily caused. Further, in recent years, the partition walls (ribs) separating the cells have become thinner, and a honeycomb structure having thinner partition walls more easily causes a deformation or the like.

In the dielectric drying, depending on the material having high dielectric constant or dielectric loss or the size and the shape of the honeycomb formed article (work) to be dried, there is a case of causing a crack in the honeycomb formed article because electro magnetic waves used for the dielectric drying promote uneven drying of the honeycomb formed article.

Therefore, it can be considered to dry the honeycomb formed article by hot air drying instead of relying on the microwave drying and the dielectric drying. However, there is a problem of easily causing a crack to deteriorate the quality and the yield even in the hot air drying method.

In view of the aforementioned problem, the present invention aims to provide a method for drying a honeycomb formed article, the method being capable of drying a honeycomb formed article in a shorter period of time with inhibiting generation of a defect such as a deformation or breakage.

SUMMARY OF THE INVENTION

In order to solve the aforementioned problem, the present inventors found out the suitable conditions described below with regard to a method for drying a honeycomb formed article by performing microwave drying or dielectric drying in the first place and subsequently performing hot air drying, and the founding led to the present invention. That is, according to the present invention, there is provided the following method for drying a honeycomb formed article.

[1] A method for drying an unfired honeycomb formed article having a plurality of cells separated by partition walls made from raw material composition containing a ceramic raw material, water, and a binder; the method comprising a first step, where the honeycomb formed article is heated and dried by microwave drying or dielectric drying, and a second step, where the honeycomb formed article is dried by hot air drying, where hot air whose humidity was adjusted to have a wet-bulb temperature of 50 to 100° C. after the first step.

[2] The method for drying a honeycomb formed article according to the above [1], wherein the binder contained in the raw material composition has a heat gelation property and/or a thermosetting property.

[3] The method for drying a honeycomb formed article according to the above [1] or [2], the raw material composition has a binder content of 1 to 10 mass %.

[4] The method for drying a honeycomb formed article according to any one of the above [1] to [3], wherein, in the second step, the hot air has a dry-bulb temperature of 100 to 200° C. in hot air drying.

[5] The method for drying a honeycomb formed article according to any one of the above [1] to [4], wherein, in the first step, the honeycomb formed article is dried so that the honeycomb formed article after the first step right after formation of the honeycomb formed article has a water content ratio of 5 to 60%, and the honeycomb formed article is dried by evaporating residual water in the second step.

[6] The method for drying a honeycomb formed article according to any one of the above [1] to [5], wherein, in the first step, in the case of using the microwave drying, the honeycomb formed article is dried by irradiating electromagnetic waves having an oscillation frequency of 300 to 10000 MHz, and, in the case of using the dielectric drying, the honeycomb formed article is dried by applying a high-frequency current having an oscillation frequency of 3 to 100 MHz.

[7] The method for drying a honeycomb formed article according to any one of the above [1] to [6], wherein the honeycomb formed article having a size and a dielectric property satisfying the following formula (I) is dried by the microwave drying by irradiating the electromagnetic waves having an oscillation frequency satisfying the following formula (I) or the dielectric drying by applying the high-frequency current having an oscillation frequency satisfying the following formula (I) in the step 1:

[Formula 1]

$$[(D/2) \times (1-A)^{1/2}]/L < 10 \qquad (I)$$

(where D denotes a diameter (m) of the honeycomb formed article, A denotes a cross sectional opening area ratio of the honeycomb formed article, and L denotes a half-power depth (m)).

[8] The method for drying a honeycomb formed article according to any one of the above [1] to [7], wherein the honeycomb formed article is dried by the microwave drying or the dielectric drying with introducing superheated steam or a mixed gas of steam and heated air into a drying furnace so that an atmosphere in the drying furnace has a wet-bulb temperature of 50 to 100° C. in the first step.

[9] The method for drying a honeycomb formed article according to any one of the above [1] to [8], wherein the method has a preliminary heating step for heating the honeycomb formed article in an atmosphere having a wet-bulb temperature of 50 to 100° C. before the first step.

A method for drying a honeycomb formed article of the present invention exhibits an effect in drying a honeycomb formed article in a shorter period of time with inhibiting generation of a defect such as a deformation or breakage.

REFERENCE NUMERALS

Figure 1:
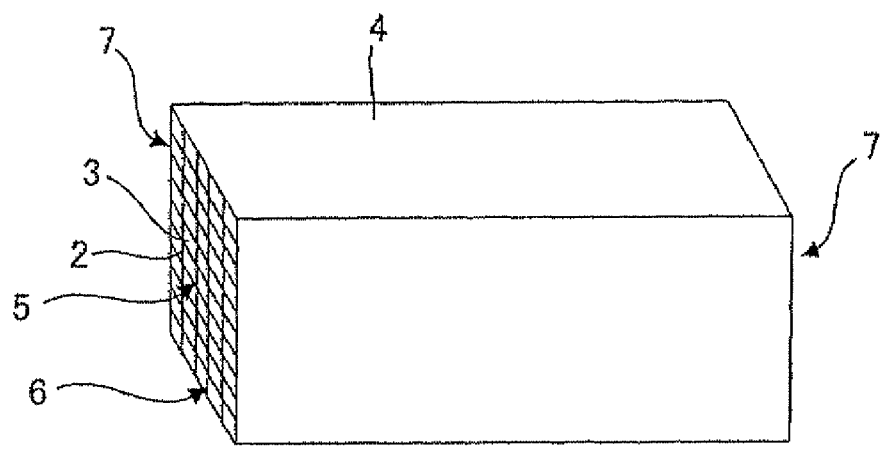
FIG. 1 is a perspective view showing an example of a honeycomb formed article used in a drying method of the present invention.

1: honeycomb formed article, 2: partition wall, 3: cell, 4: outer peripheral wall, 5: central portion, 6: outer peripheral portion, 7: end face where cells are open, 11: hot air drying apparatus, 12: drying chamber, 13: steam nozzle, 14: patching plate for adjusting a flow, 15: work-mounting plate, 16: discharge port: 17: upper chamber, 18: lower chamber, 19: restriction plate, 20: inflow port, 21: dielectric drying apparatus, 22: electrode

DETAILED DESCRIPTION OF THE INVENTION

Hereinbelow, an embodiment of the present invention will be described with referring to drawings. However, the present invention is by no means limited to the following embodiment, and changes, modifications, and improvements may be made as long as they do not deviate from the scope of the present invention.

A. Method for Drying a Honeycomb Formed Article:

A-1. Summary of a Method for Drying a Honeycomb Formed Article of the Present Invention:

A method for dying a honeycomb formed article of the present invention (hereinbelow referred to as a "drying method of the present invention") is a method for drying an unfired honeycomb formed article 1 made of a raw material composition containing a ceramic raw material, water, and a binder and having a plurality of cells 3 separated by partition walls 2 and functioning as fluid passages as the honeycomb formed articles 1 shown by the perspective views of FIGS. 1 and 2. In a drying method of the present invention, the first step is performed in the first place, where a honeycomb formed article is heated and dried by microwave drying or dielectric drying using a dielectric drying apparatus 21 as shown in the schematic view of FIG. 3 with respect to an unfired honeycomb structure 1 having a structure as shown in, for example, the schematic views shown in FIGS. 1 and 2. In a drying method of the present invention, after the first step, the second step is subsequently performed, where the honeycomb formed article 1 is dried by hot air drying where hot air having a humidity adjusted to be wet-bulb temperature of 50 to 100° C. is passed through the cells 3 using a hot air drying apparatus 11 as shown in a schematic view shown in FIG. 4.

The "hot air" described here means a flow of gas having a dry-bulb temperature of 100° C. or more. Incidentally, a composition of gas constituting the hot air is not particularly limited.

The drying method of the present invention can shorten the drying time by combining the first step by microwave drying or dielectric drying having fast drying speed and the subsequent second step by hot air drying. In addition, since the drying method of the present invention employs an embodiment where a honeycomb formed article is finally dried by hot air drying of the second step, it can inhibit, drying unevenness, combustion of a honeycomb according to excessive temperature rise, or burnout of the drying apparatus caused when a honeycomb formed article is finally dried by employing only microwave drying or dielectric drying. In addition, by inhibiting drying unevenness of the honeycomb formed article, also a deformation or a crack (cut) of a partition wall can be inhibited.

Further, in a drying method of the present invention, hot air drying of the second step is performed by hot air having a wet-bulb temperature of 50 to 100° C. By drying by hot air having such humidity, excessive evaporation of water from the partition walls and the outer peripheral wall of the honeycomb formed article can be inhibited, and temperature decrease of the honeycomb formed article under drying due to heat of evaporation in accordance with water evaporation and the resultant deterioration in strength of the honeycomb formed article can be inhibited. In particular, in the case that a binder having a heat gelation property and a thermosetting property is contained in the raw material composition serving as a material for the honeycomb formed article, by using hot air having a wet-bulb temperature of 50 to 100° C. in hot air drying of the second step, temperature of a honeycomb formed article under the hot air dying is kept at gelation temperature (generally about 50° C.) or more of the binder. Therefore, a deformation or a crack (cut) in the partition walls or the outer peripheral wall of the honeycomb formed article can be inhibited.

Hereinbelow, after description of a "honeycomb formed article" as an object to be dried in a drying method of the present invention will be described, the "first step" and the "second step" will be described in this order.

Figure 2:
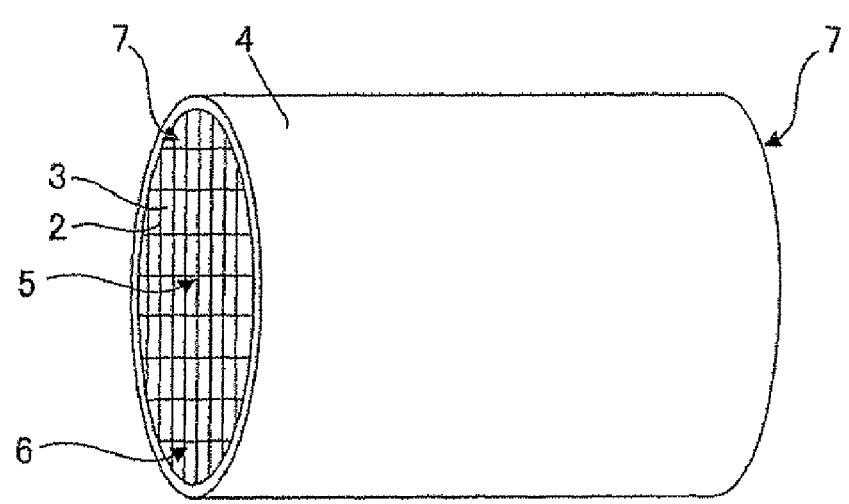
FIG. 2 is a perspective view showing another embodiment of a honeycomb formed article used in a drying method of the present invention.
Figure 3:
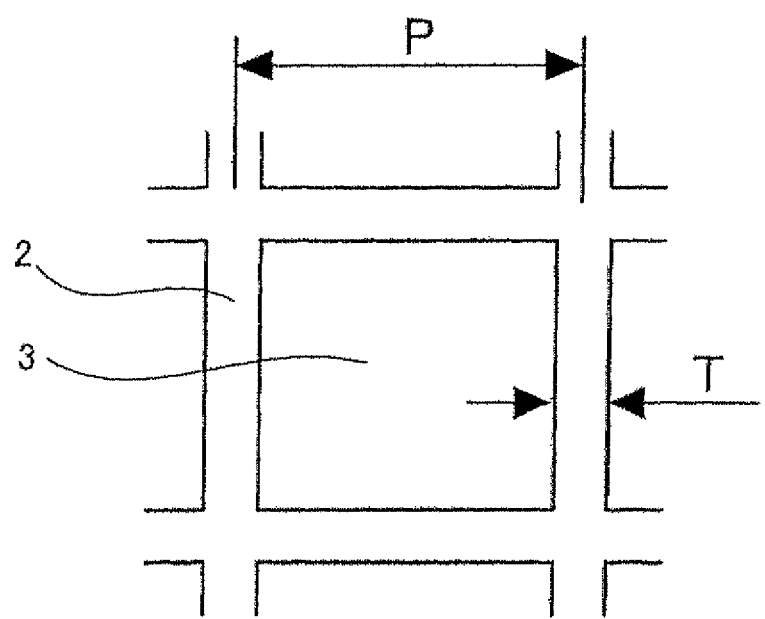
FIG. 3 is a schematic view where a cross section of a honeycomb formed article used in a drying method of the present invention is enlarged.

A-1: Honeycomb Formed Article:

A honeycomb formed article dried in a method for drying a honeycomb formed article of the present invention has a plurality of cells 3 separated by partition walls 2 and functioning as fluid passages, for example, as the honeycomb formed articles 1 shown the perspective views in FIGS. 1 and 2. In addition, the honeycomb formed article 1 is constituted by disposing the end faces 7 where cells 3 are open and the outer peripheral wall 4 to surround a plurality of cells 3. Incidentally, the shape of a cross section perpendicular to the axial direction (flow passage direction) of the cells is not particularly limited, and any shape such as a quadrangle or a cylinder as in the honeycomb formed articles 1 shown by the perspective views of FIGS. 1 and 2 may arbitrarily be selected.

A-1-1. Raw Material Composition of a Honeycomb Formed Article:

A honeycomb formed article is manufactured by preparing kneaded clay (hereinbelow referred to as a "kneaded clay mass") having a cylindrical shape or the like by mixing, kneading, and deairing a raw material composition containing, for example, a ceramic raw material, water and a binder and subjecting the kneaded clay mass to extrusion forming.

Examples of the ceramic raw material include oxide based ceramics such as alumina, mullite, zirconia, and cordierite; and non-oxide based ceramics such as silicon carbide, silicon nitride, and aluminum nitride. Incidentally, the cordierite contains a mixed powder of a plurality of ceramic raw materials which form cordierite by firing. In addition, silicon carbide/metal silicon composite material or silicon carbide/graphite composite material may be used.

As the binder contained in the raw material composition serving as a material for a honeycomb formed article to be dried in a drying method of the present invention, a binder having a heat gelation property and/or a thermosetting property is preferable. By making the raw material composition containing a binder having a heat gelation property and/or a thermosetting property, it is possible to increase strength of the partition walls and outer peripheral wall of the honeycomb formed article by raising the temperature of the partition walls and outer peripheral wall of the honeycomb formed article to the gelation temperature or more by heating the honeycomb formed article in a drying method of the present invention. The heat gelation property here means a property where heating of an aqueous solution of the binder causes gelation and increases viscosity. In addition, the thermosetting property here means a property where heating of the honeycomb formed article or the raw material composition increases strength. Examples of the binder having a heat gelation property and a thermosetting property include methyl cellulose, hydroxypropylmethyl cellulose, carboxymethyl cellulose, hydroxyethyl cellulose, and hydroxyethylmethyl cellulose. Of these, methyl cellulose is most generally used. Though gelation temperature of these gelation binders differs depending on the kind, it is about 50 to 80° C. For example, in the case of methyl cellulose, it is about 55° C. Different kinds of gelation binders may be mixed for use. Though it is possible to use also a binder having neither a heat gelation property nor a thermosetting property together, it is preferable to use a binder having a heat gelation property and/or a thermosetting property as the main component, and it is most preferable to use only a binder having a heat gelation property and/or a thermosetting property.

The binder contained in the raw material composition serving as a material for a honeycomb formed article to be dried in a drying method of the present invention is preferably added to the raw material composition at a ratio of 1 to 10 mass % in total. In the case that the binder content is below 1 mass %, formability and shape retainability decrease, which is not preferable. In the case that the binder content is above 10 mass %, excessive temperature rise is caused upon binder combustion when the honeycomb formed article dried in a drying method of the present invention is fired and degreased, and therefore, a crack (cut) is caused in a partition wall or an outer peripheral wall of the honeycomb formed article, which is not preferable. A preferable lower limitation of the content is 1.5 mass %, furthermore preferable lower limitation is 2 mass %, a preferable upper limitation of the content is 8 mass %, and furthermore preferable upper limitation is 6 mass %.

A-1-2. Size and Property of a Honeycomb Formed Article

A kneaded clay mass having a cylindrical shape or the like is prepared by mixing, kneading, and deairing the raw material composition. From the kneaded clay mass, a honeycomb formed article 1 having a structure shown by the perspective view of FIG. 1 is formed by, for example, extrusion forming. Since electromagnetic waves are effectively irradiated to the whole honeycomb formed article 1 upon microwave drying, or since a high-frequency current is applied to the whole honeycomb formed article 1 upon dielectric drying, the honeycomb formed article 1 dried by a drying method of the present invention preferably has a size and a dielectric property satisfying the conditions of the following formula (I), and more preferably has a size and a dielectric property satisfying the conditions of the following formula (II).

[Formula 2]

$$[(D/2)\times(1-A)^{1/2}]/L<10 \qquad (I)$$

[Formula 3]

$$[(D/2)\times(1-A)^{1/2}]/L<5 \qquad (II)$$

(where D denotes a diameter (m) of the honeycomb formed article, A denotes a cross sectional opening area rate of the honeycomb formed article, and L denotes a half power depth (m))

The half power depth L (m) is expressed by the following formula (III) on the basis of a dielectric constant (e) and dielectric loss constant (tan δ) of the kneaded clay mass and an oscillation frequency of electromagnetic waves irradiated upon microwave drying or a high-frequency current applied upon dielectric drying.

[Formula 4]

$$L=(3.32\times10^7)/(f\cdot\varepsilon^{1/2}\cdot\tan\delta) \qquad (III)$$

Incidentally, the diameter D (m) of a honeycomb formed article used in the above formula (I) means a diameter of a cross section perpendicular to the flow passage direction of the honeycomb formed article. For example, as the honeycomb formed article 1 shown in FIG. 2, when the cross section is circular, the diameter means literally the diameter of a circular cross section. When the cross section is a quadrangle as the honeycomb formed article 1 shown in FIG. 1, the longer diagonal line D' (m) of the quadrangle is employed as the diameter D (m) of the honeycomb formed article to be applied to the aforementioned formula (I) or (II) As it is understood from the expression of the longer diagonal line D' described above, the diameter D (m) of the honeycomb formed article 1 can be applied to a cross section of any quadrangle. In addition, in the case that the cross section of the honeycomb formed article 1 is an ellipse, the longer axis of the cross section is employed as the diameter D (m) of the honeycomb formed article to be applied to the aforementioned formula (I) or (II). A cross sectional opening area ratio of the honeycomb formed article can be specified by the following formula (IV) with a cell pitch P (m) and a partition wall thickness T (m) in the case of a honeycomb formed article 1 having quadrangular cells, for example, as the cross sectional view showing in FIG. 3.

[Formula 5]

$$A=[(P-T)/P]^2 \qquad (IV)$$

(where A denotes a cross sectional opening area ratio of the honeycomb formed article, P denotes a cell pitch (m), and T denotes a partition wall thickness (m))

Here, description will be given regarding a method for measuring the dielectric constant and the dielectric loss constant tan δ of the kneaded clay mass serving as a material for the honeycomb formed article. The dielectric constant and the dielectric loss constant tan δ of the kneaded clay mass serving as a material for the honeycomb formed article can be measured by a network analyzer (Trade name: Network analyzer and 85070E dielectric probe kit produced by Agilent Technologies, Inc.) or the like by processing the kneaded clay mass so as to give a test piece having dimensions of 50 mm×50 mm×50 mm from a raw material composition of the same lot as the raw material composition for preparing the kneaded clay mass for forming a honeycomb formed article and controlling the temperature of the kneaded clay mass of the test piece at 20° C. in an oscillation frequency of 300 to 10000 MHz. In addition, in an oscillation frequency of 3 to 100 MHz, it can be measured by a RF impedance analyzer (Trade name: HP4291B produced by Hewlett-Packard Company) or the like by processing the kneaded clay mass so as to give a test piece having dimensions of 20 mm×20 mm×1 mm from a raw material composition of the same lot as the raw material composition for preparing the kneaded clay mass for forming a honeycomb formed article and controlling the temperature of the kneaded clay mass of the test piece at 20° C.

A-2. First Step

The partition walls 2 and the outer peripheral wall 4 of the honeycomb formed article 1 right after being formed into a structure as shown in perspective views of FIG. 1 or 2 contains a large amount of water. Therefore, in order to dry the honeycomb formed article by evaporating water from the partition walls 2 and the outer peripheral wall 4 of the honeycomb formed article 1, the honeycomb formed article 1 is dried in the unfired stage. A drying method of the present invention is a method for drying a honeycomb formed article in this unfired stage, and, in the first place, the first step by microwave drying or dielectric drying is performed as described below.

In the first step, it is preferable to dry the honeycomb formed article in such a manner that the honeycomb formed article after the first step has a water content ratio (hereinbelow, referred to as a "water content ratio of a honeycomb formed article after the first step") of 5 to 60% to the honeycomb formed article right after formation. Here, the "water content ratio of a honeycomb formed article after the first step" is calculated by multiplying the value obtained by dividing the water content of the honeycomb formed article right after the first step by the water content of the honeycomb formed article right after the formation by 100. The water content of the honeycomb formed article right after the formation is a mass proportion (mass %) of water in the total mass of the raw material composition upon preparing a raw material composition. The water content of the honeycomb formed article right after the first step is calculated by dividing the water content of the honeycomb formed article right after the first step obtained from the difference between the mass of the honeycomb formed article right after the first step and the mass of the honeycomb formed article in an absolute dry state by the mass of the honeycomb formed article right after the formation.

When the first step is performed in such a manner that the water content of the honeycomb formed article after the first step exceeds 60%, in a honeycomb formed article under conditions not satisfying the above formula (II), the temperature in the central portion of the honeycomb formed article does not reach 50° C., and, in the case of sending hot air which has humidity being adjusted to be wet-bulb temperature of 50 to 100° C. in the subsequent second step, the hot air is cooled in the cells of the honeycomb formed article to form a dew on a partition wall. Therefore, in a honeycomb formed article under conditions not satisfying the above formula (II), the honeycomb formed article absorbs humidity and swells to easily cause a defect such as a deformation in shape. In addition, a honeycomb formed article under conditions not satisfying the above formula (II), drying is mainly performed by hot air drying, which has a lower drying speed than microwave drying and dielectric drying, due to the swelling by absorption of humidity of the honeycomb formed article in the first step, and the time spent for the hot air drying in the second step is increased, which is not preferable. The water content ratio of the honeycomb formed article after the first step is preferably 50% or less, more preferably 40% or less. In addition, in the case of performing the first step in such a manner that the water content ratio of the honeycomb formed article after the first step is below 5%, an energy load by the microwave drying or the dielectric drying in the first step increases, and the risk of burnout of the drying apparatus due to excessive temperature rise or excessive discharge in the first step increases, which is not preferable.

A-2-1. Microwave Drying:

The microwave drying used in the first step of a drying method of the present invention is performed by irradiating electromagnetic waves (microwaves) to an unfired honeycomb formed article disposed in the dying furnace. The oscillation frequency of the electromagnetic waves (microwaves) irradiated to the honeycomb formed article in the microwave drying method is 300 to 10000 MHz. However, an oscillation frequency of 915 MHz or 2450 MHz, which are used for an industrial heating furnace, is more preferable from the viewpoint of facility costs.

In addition, in microwave drying used in the first step of drying method of the present invention, the oscillation frequency of the electromagnetic wave (microwave) irradiated to the honeycomb formed article preferably satisfies the conditions of the above formula (I), more preferably satisfies the above formula (II) from the viewpoint of uniform drying. Incidentally, in order to calculate L on the left-hand side of the in equalities shown by the formulae (I) and (II), an oscillation frequency f of electromagnetic waves is applied to the above formula (III). For example, in a honeycomb formed article 1 having a structure as the honeycomb formed article 1 shown in the perspective view of FIG. 1 and having a size and a dielectric property satisfying the above formula (II), the electromagnetic waves irradiated upon microwave drying reach the central portion 5 of the honeycomb formed article 1, and the electromagnetic waves can cause heating in both the central portion 5 and the outer peripheral portion 6.

Incidentally, in the microwave drying of the first step, it is preferable to dry the honeycomb formed article 1 with introducing superheated steam or a mixed gas of steam and heated air into the drying furnace so that the atmosphere in the drying furnace has a wet-bulb temperature of 50° C. to 100° C. The wet-bulb temperature has correlations with dry-bulb temperature, relative humidity, and atmospheric pressure and is not higher than the dry-bulb temperature. When the wet-bulb temperature is the same as the dry-bulb temperature, the relative humidity is 100%. Therefore, the wet-bulb temperature of 50° C. to 100° C. means that the dry-bulb temperature in the drying furnace is 50° C. or more. In the case that the honeycomb formed article 1 shown by the perspective view of FIG. 1 is disposed in the drying furnace, at least the temperature of the partition walls 2 and the outer peripheral wall 4 in the outer peripheral portion 6 vulnerable to the atmosphere in the drying furnace can generally be controlled at 50° C. or more, which is the gelation start temperature of the binder contained in the raw material composition serving as a material for a honeycomb formed article.

In addition, it is more preferable that the atmosphere in the drying furnace used in microwave drying of the first step has a wet-bulb temperature of 60 to 90° C. By controlling the atmosphere in the drying furnace used in microwave drying of the first step to have a wet-bulb temperature of 60 to 90° C., the absolute temperature in the drying furnace comes closer to the level where uniform drying can be realized, which can inhibit temperature decrease in the partition walls 2 in the outer peripheral portion 6 according to excessive water evaporation in the outer peripheral portion 6 of the honeycomb formed article 1 described below and realize uniform drying without unevenness between the central portion 5 and the outer peripheral portion 6 of the honeycomb formed article 1.

When the microwave drying is performed under the conditions satisfying the above formula (II), in the honeycomb formed article 1, water evaporation is easily facilitated in the partition walls 2 and the outer peripheral wall 4 in the outer peripheral portion 6 of the honeycomb formed article 1 in comparison with the central portion 5 present in the closed environment surrounded by the partition wall 2 of the honeycomb formed article 1. Therefore, temperature is decreased more easily in the partition walls 2 and the outer peripheral wall 4 of the outer peripheral portion 6 of the honeycomb formed article 1 than in the partition walls 2 of the central portion 5 of the honeycomb formed article 1 due to heat of evaporation in accordance with water evaporation. In addition, in the honeycomb formed article 1 satisfying the above formula (II), electromagnetic waves can effectively be irradiated, and sufficient heating up to the central portion 5 can be performed. Therefore, when microwave drying is performed under conditions satisfying the above formula (II), enlargement in temperature difference between the central portion 5 having high temperature and the outer peripheral portion 6 having low temperature in the honeycomb formed article 1 may be facilitated. Due to the temperature decrease in the partition walls 2 and the outer peripheral walls 4 in the outer peripheral portion 6 of the honeycomb formed article 1 or enlargement of the temperature difference between the central portion 5 and the outer peripheral portion by the microwave drying, stress due to drying strain is caused in the partition walls 2 and the outer peripheral wall 4 in the honeycomb formed article, and this may cause a deformation of the partition walls 2 or the outer peripheral wall 4 or a crack (cut) in the partition walls 2 or the outer peripheral wall 4. Therefore, by controlling the atmosphere in the drying furnace used in microwave drying of the first step to have a wet-bulb temperature of 50 to 100° C., the temperature of the outer peripheral wall 4 in the honeycomb formed article 1 is at least the gelation temperature, which is the same as the wet-bulb temperature, to inhibit deterioration in strength of the honeycomb formed article 1.

Further, in a drying method of the present invention, it is preferable that the method has a preliminary heating step for heating the honeycomb formed article 1 in an atmosphere having a wet-bulb temperature of 50 to 100° C. before the first step. The preliminary heating step can be performed by, for example, disposing a honeycomb formed article 1 in a drying furnace for performing microwave drying and introducing superheated steam or a mixed gas of steam and heated air prior to irradiation of electromagnetic waves.

Figure 4:
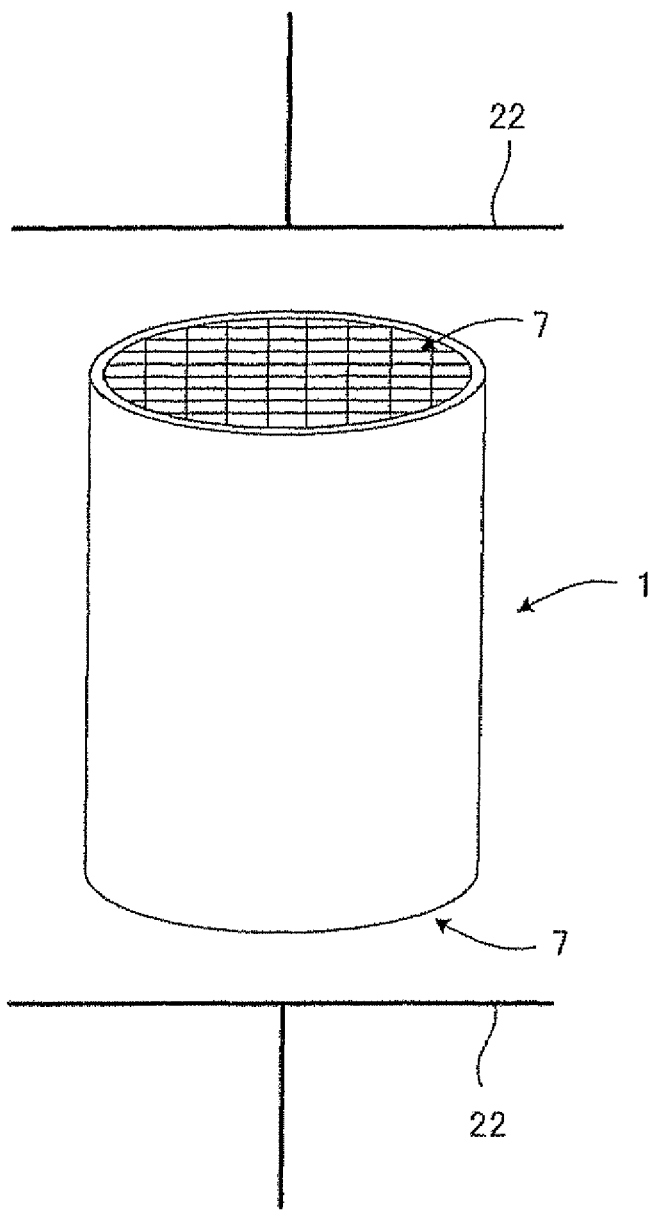
FIG. 4 is a schematic view showing an inside portion of a dielectric drying apparatus where a honeycomb formed article is housed.

A-2-2. Dielectric Drying:

Dielectric drying used in the first step of a drying method of the present invention can be performed by, for example, disposing the honeycomb formed article 1 shown by the perspective view of FIG. 2 in the dielectric drying apparatus 21 shown by the perspective view of FIG. 4, applying a high-frequency current between the electrodes 22 facing each other on the upper side and the lower side of the honeycomb formed article 1 in the dielectric drying apparatus 21, and heating and drying from inside of the partition walls 2 and the outer peripheral walls 4 of the honeycomb formed article 1 by dielectric loss generated inside the partition walls 2 and the outer peripheral wall 4 of the honeycomb formed article 1. That is, in the dielectric drying apparatus 21, the honeycomb formed article 1 is heated and dried in proportion to the electric field distribution inside the honeycomb formed article 1. The oscillation frequency of the high-frequency current applied in the dielectric drying is preferably 3 to 100 MHz. Further, from the viewpoint of uniform drying like the oscillation frequency of electromagnetic waves irradiated in the aforementioned microwave drying, in the dielectric drying used in the first step of a drying method of the present invention, an oscillation frequency satisfying the conditions of the above formula (I) is more preferable, and an oscillation frequency satisfying the conditions of the above formula (II) is most preferable. In addition, an oscillation frequency of 6 to 50 MHz, which are used for an industrial heating furnace, is more preferable from the viewpoint of facility costs.

Like the aforementioned case of microwave drying, from the viewpoint of inhibiting harmful effects due to temperature difference and difference in drying speed between the central portion 5 and the outer peripheral portion 6 in a honeycomb formed article 1, it is preferable that the dielectric drying in the first step is performed with introducing superheated steam or a mixed gas of steam and heated air into a drying furnace so that an atmosphere in the drying apparatus 21 has a wet-bulb temperature of 50 to 100° C. in the first step, and it is more preferable that an atmosphere in the drying apparatus 21 has a wet-bulb temperature of 60 to 90° C.

Further, from a viewpoint similar to the case of the aforementioned microwave drying, it is preferable to perform a preliminary heating step for heating the honeycomb formed article 1 in an atmosphere having a wet-bulb temperature of 50 to 100° C. before the dielectric drying in a drying method of the present invention.

Figure 5:
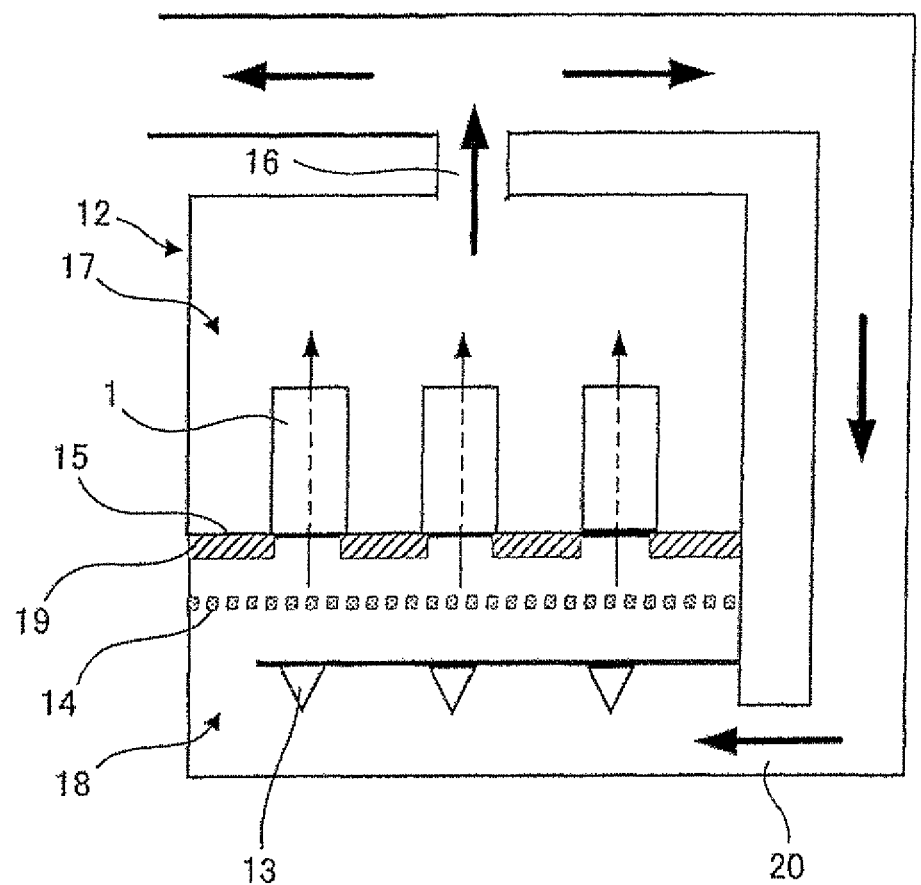
FIG. 5 is a schematic view showing an inside portion of a hot air drying apparatus where a honeycomb formed article is housed.

A-3. Second Step:

A-3-1. Summary of Hot Air Drying:

In the second step of a drying method of the present invention, with referring to drying of the honeycomb formed article 1 shown by the perspective view of FIG. 1 as an example, after the first step by the aforementioned microwave drying or dielectric drying, a honeycomb formed article 1 is disposed inside a hot air drying apparatus 11 as shown by a schematic view of FIG. 5, and the honeycomb formed article 1 is dried by hot air drying, where hot air having a wet-bulb temperature of 50 to 100° C. is passed through the cells 3 of the honeycomb formed article 1.

In a drying method of the present invention, by controlling the wet-bulb temperature of hot air sent in hot air drying of the second step to 50 to 100° C., excessive water evaporation from the partition walls 2 and the outer peripheral walls 4 of the honeycomb formed article 1 is inhibited, and deterioration in strength of a honeycomb formed article 1 due to temperature decrease due to heat of evaporation generated by water evaporation in the honeycomb formed article 1 under drying is inhibited, and therefore a crack in the partition walls 2 and the outer peripheral wall 4 and a deformation of the partition walls 2 and the outer peripheral wall 4 can be inhibited. Incidentally, in a drying method of the present invention, there is no particular limitation on the method for adjusting humidity and the like of hot air sent and the method for passing the hot air though the cells 3 of the honeycomb formed article 1 in the hot air drying, and any method usually used by a person of ordinary skill can be employed. A preferable lower limitation of the wet-bulb temperature of the hot air sent in the hot air drying of the second step is 55° C., a furthermore preferable lower limitation is 60° C., a preferable upper limitation is 90° C., and a furthermore preferable upper limitation is 80° C.

Further, in a drying method of the present invention, the hot air sent in the hot air drying of the second step has a dry-bulb temperature of preferably 100 to 200° C., more preferably 110 to 150° C. When it is below 100° C., which does not satisfy the aforementioned conditions of hot air, drying time is too long. On the other hand, when the dry-bulb temperature of hot air is above 200° C., a binder material is removed, and the honeycomb formed article becomes brittle to easily cause a deformation, breakage, or the like. In a drying method of the present invention, the optimal temperature of the hot air sent in the hot air drying of the second step is not unambiguous and should be changed depending on the kinds of the ceramic and the binder. Incidentally, in hot air drying of the second step, drying is preferably performed until the water content becomes 1% or less.

Further, from the viewpoint of inhibiting due generation on the partition walls 2 due to temperature decrease of the hot air upon passing through the cells 3 of the honeycomb formed article 1, it is preferable that the wet-bulb temperature of the hot air sent in the hot air drying of the second step is lower than the temperature of the honeycomb formed article.

A-3-2. Hot Air Drying Apparatus:

An example of the apparatus used for passing hot air through the cells 3 of the honeycomb formed article 1 in the hot air drying of the second step of the present invention is the hot air drying apparatus 11 shown by the schematic view of FIG. 5. The hot air drying apparatus 11 shown by the schematic view of FIG. 5 has a drying chamber 12 therein. The drying chamber 12 is separated into the upper chamber 17 and the lower chamber 18 by the work-mounting plate 15, where the honeycomb formed article 1 is mounted. Further, a steam nozzle 13 as a steam supply portion is disposed in the lower portion of the lower chamber 18, and a punching plate 14 for adjusting a flow is disposed between the steam nozzle 13 and the work-mounting plate 15.

Description will be made regarding preparation of hot air passed through the cells 3 of the honeycomb formed article 1 with referring to a schematic view of FIG. 5. The air flowing into the lower portion of the lower chamber 18 from the inflow port 20 is mixed with steam supplied from the steam nozzle 13 to form a flow ascending the lower chamber as hot air. The hot air passes through the punching plate 14 for adjusting a flow, the work-mounting plate 15, and the cells 3 of the honeycomb formed article 1 disposed on the work-mounting plate 15. The hot air passing through the cells 3 and ascending in the upper chamber 17 is discharged to the outside of the drying chamber 12 from the discharge port 16, and a part of the discharged hot air is recovered and again flows into the lower chamber 18 from the inflow port 20. Incidentally, though FIG. 5 shows a partial circulation type, the apparatus is not limited to this type as long as necessary conditions can be realized and may be a circulation type or a non-circulation type.

In the hot air drying apparatus 11 shown in the schematic view of FIG. 5, the work-mounting plate 15 has a flat face shape and a portion where hot air can circulate by making a hole or a net or lattice shape and is disposed in such a manner that the face is along the horizontal direction. By such formation of the work-mounting plate 15, a honeycomb formed article 1 as shown by the perspective view of FIG. 1 can stably be disposed by setting the extending direction of the cells 3 along the vertical direction where the hot air flows by being mounted in such a manner that an end face 7 having opening cells 3 accords with the upper face of the work-mounting plate 15. By disposing a honeycomb formed article 1 in such a manner that an end face 7 having opening cells 3 accords with the portion where hot air can circulate of the work-mounting plate 15, hot air whose humidity is suitably adjusted by the steam nozzle 13 in the lower chamber 18 can pass through the cells 3 of the honeycomb formed article 1 disposed on the work-mounting plate 15. In addition, the punching plate 14 for adjusting a flow is a plate-shaped member provided with, for example, holes each having a diameter of 1 to 10 mm and an opening ratio of 20 to 95% and disposed so as to separate the lower chamber into the upper portion and the lower portion as shown by the schematic view of FIG. 5. By the formation, hot air passed through the holes provided in the punching plate 14 for adjusting a flow can suitably be mixed with steam. The opening ratio is more preferably 20 to 60%.

Further, in the hot air drying apparatus 11 shown by the schematic view of FIG. 5, from the viewpoint of improving the drying efficiency of the honeycomb formed article 1, the work-mounting plate 15 preferably has a form where all the hot air flowing from the lower chamber 17 to the upper chamber 18 passes through the cells 3 of the honeycomb formed article 1. In order to realize this embodiment, for example, as shown by the schematic view of the hot air drying apparatus 11 of FIG. 5, a restriction plate 19 for blocking circulation of the hot air may be attached on the lower or upper face of the work-mounting plate 15. The restriction plate 19 is preferably attached on the lower face of the work-mounting plate 15 lest the work should be damaged. In the restriction plate 19 attached on the lower face of the work-mounting plate 15, a hole may be made in accordance with the outline of an end face 7 having opening cells 3 of the honeycomb formed article 1, and the honeycomb formed article 1 is put on the work-mounting plate 15 in such a manner that the end face 7 having opening cells 3 of the honeycomb formed article 1 matches the portion where a hole is made in the restriction plate 19 upon hot air drying. By such an embodiment, all the hot air flowing from the lower chamber 17 to upper chamber 18 passes through the hole of the restriction plate 19 and subsequently passes through the cells 3 of the honeycomb formed article 1 disposed on the work-mounting plate 15. Incidentally, though FIG. 4 shows a batch type drying apparatus, the apparatus is not limited to this type and may be a circulation type.

By the aforementioned method for drying a honeycomb formed article of the present invention, drying of a honeycomb formed article can be realized in a shorter period of time with inhibiting generation of a defect such as a deformation or breakage. Incidentally, though there is a case of showing a numeral at the end of a term in the above description, even if the numeral is given at the end of a term, a technical scope of the present invention is not limited to the embodiment shown in the drawings, and a technical scope of the present invention is specified to a scope where a person of ordinary skill can think of from the forms shown in the drawings and the descriptions in the present specification.

EXAMPLE

Hereinbelow, the present invention is described in more detail on the basis of Examples. However, the present invention is by no means limited to these Examples.

B-1. Consideration on Wet-bulb Temperature and Dry-bulb Temperature of Hot Air to be Used in Hot Air Drying:

B-1-1. Drying of a Honeycomb Formed Article:

Example 1

(1) Honeycomb Formed Article:

Drying of a honeycomb formed article 1 having an external shape shown by the perspective view of FIG. 2 was performed. The honeycomb formed article 1 employed a raw material composition containing a ceramic raw material, 3 mass % of methyl cellulose (MC) and 1 mass % of hydroxypropylmethyl cellulose (HPMC) as binders, and water. The raw material composition was subjected to mixing, kneading, and deairing to prepare a cylindrical kneaded clay mass. The kneaded clay mass was subjected to extrusion forming to obtain a honeycomb formed article 1 (outer diameter×flow passage length: 286 mm×370 mm, number of cells: 300 cells, partition walls thickness: 0.305 mm). The honeycomb formed article 1 had a water content of 27% right after the formation. First, the honeycomb formed article 1 was dried in the first step of microwave drying. Incidentally, the honeycomb formed article 1 had a cross sectional opening area ratio of 0.63, a dielectric constant ($\in$) of 28.6 of the raw material composition for the honeycomb formed article 1, and a dielectric loss constant (tan δ) of 0.20, a half-power depth (L) of 0.013 m with respect to electromagnetic waves having an oscillation frequency of 2450 MHz, and a value of 6.9 (<10) on the left-hand side of the aforementioned formula (I).

(2) Microwave Drying (First Step):

In the first place, as the first step, the honeycomb formed article 1 was subjected to microwave drying. The microwave drying was performed by heating the honeycomb formed article 1 by irradiating electromagnetic waves having an oscillation frequency of 2450 MHz and an output power of 24 kW for nine minutes in an atmosphere having a dry-bulb temperature of 60° C. and a wet-bulb temperature of 60° C. Incidentally, the honeycomb formed article 1 after the microwave drying had a water content of 10%, which was calculated by measuring the mass of the honeycomb formed article 1 having the same mass as the honeycomb formed article 1 right after the microwave drying in the absolute drying state. Therefore, the water content ratio, which was represented by (water content after microwave drying)/(water content right after forming)×100 of the honeycomb formed article after the first step was 37%.

(3) Hot Air Drying (Second Step)

As the second step after microwave drying, using a hot air drying apparatus 11 shown by a schematic view of FIG. 5, the honeycomb formed article 1 was disposed on the work-mounting plate 15 in such a manner that an end face 7 having opening cells 3 of the honeycomb formed article 1 accorded with the upper face of the work-mounting plate 15. Hot air drying was performed for six minutes by sending hot air from the lower chamber 18 and passing the hot air through the cells 3 of the honeycomb formed article 1. Incidentally, in the hot air drying apparatus 11, by attaching a restriction plate 19 having holes to the lower face of the work-mounting plate 15, all the hot air flowing from the lower chamber 18 to the upper chamber 17 was passed through the cells 3 of the honeycomb formed article 1 disposed on the work-mounting plate 15. The hot air had a dry-bulb temperature of 120° C., a wet-bulb temperature of 60° C., and a flow rate of 60 m³/min. By the aforementioned steps, drying of the honeycomb formed article of Example 1 was performed.

Example 2

The honeycomb formed article 1 was dried in the same manner as in Example 1 except that the wet-bulb temperature of the hot air sent in hot air drying was 50° C. and that the drying time was five minutes.

Example 3

The honeycomb formed article 1 was dried in the same manner as in Example 1 except that the wet-bulb temperature of the hot air sent in hot air drying was 80° C. and that the drying time was ten minutes.

Example 4

The honeycomb formed article 1 was dried in the same manner as in Example 1 except that the dry-bulb temperature of the hot air sent in hot air drying was 220° C. and that the drying time was two minutes.

Comparative Example 1

The honeycomb formed article 1 was dried in the same manner as in Example 1 except that the wet-bulb temperature of the hot air sent in hot air drying was 34° C. and that the drying time was four minutes.

Example 5

The honeycomb formed article 1 was dried in the same manner as in Example 1 except that the water content ratio of the honeycomb formed article after the first step was 15% and that the drying time was five minutes.

Example 6

The honeycomb formed article 1 was dried in the same manner as in Example 5 except that the dry-bulb temperature of the hot air sent in hot air drying was 220° C.

Comparative Example 2

The honeycomb formed article 1 was dried in the same manner as in Example 5 except that the wet-bulb temperature of the hot air sent in hot air drying was 34° C.

B-1-2. Results:

Tables 1 and 2 show results of visual inspection on a crack (cut) of the partition wall 2 and the outer peripheral wall 4 and generation of a cell deformation regarding the honeycomb formed articles 1 dried in Examples 1 to 6 and Comparative Examples 1 and 2. In Examples 1 to 4 and Comparative Example 1, where the water content ratio of the honeycomb formed article after the first step was 37%, no crack in the honeycomb formed article and no deformation of the cells were observed in Examples 1 to 4, while cracks were observed in three honeycomb formed articles out of three honeycomb formed articles in Comparative Example 1. In Examples 5 and 6 and Comparative Example 2, where the water content ratio of the honeycomb formed article after the first step is 15%, no crack in the honeycomb formed article and no deformation of the cells were observed in Examples 5 and 6, while 38 honeycomb formed articles had cracks out of 60 honeycomb formed articles in Comparative Example 2. Incidentally, in Examples 4 and 6, the binder contained in a honeycomb formed article 1 was combusted.

TABLE 1

| | First step (microwave drying) | | | Second step (hot air drying) | | | Evaluation | | | |
|---|---|---|---|---|---|---|---|---|---|---|
| | Dry-bulb temp. (° C.) | Wet-bulb temp. (° C.) | Water content ratio*[1] (%) | Dry-bulb temp. (° C.) | Wet-bulb temp. (° C.) | Drying time*[2] (min.) | Total test articles | Cracked article | Cell deformed article | Binder combusted article |
| Example 1 | 60 | 60 | 37 | 120 | 60 | 6 | 5 | 0 | 0 | 0 |
| Example 2 | 60 | 60 | 37 | 120 | 50 | 5 | 3 | 0 | 0 | 0 |
| Example 3 | 60 | 60 | 37 | 120 | 80 | 10 | 3 | 0 | 0 | 0 |
| Example 4 | 60 | 60 | 37 | 220 | 60 | 2 | 1 | 0 | 0 | 1 |
| Comp. Ex. 1 | 60 | 60 | 37 | 120 | 34 | 4 | 3 | 3 | 0 | 0 |

*[1]Water content ratio of honeycomb formed article after the first step
*[2]Time required for drying the honeycomb formed article until the water content becomes below 1%

TABLE 2

| | First step (microwave drying) | | | Second step (hot air drying) | | | Evaluation | | | |
|---|---|---|---|---|---|---|---|---|---|---|
| | Dry-bulb temp. (° C.) | Wet-bulb temp. (° C.) | Water content ratio*[1] (%) | Dry-bulb temp. (° C.) | Wet-bulb temp. (° C.) | Drying time*[2] (min.) | Total test articles | Cracked article | Cell deformed article | Binder combusted article |
| Example 5 | 60 | 60 | 15 | 120 | 60 | 5 | 20 | 0 | 0 | 0 |
| Example 6 | 60 | 60 | 15 | 220 | 60 | 5 | 1 | 0 | 0 | 1 |
| Comp. Ex. 2 | 60 | 60 | 15 | 120 | 34 | 5 | 60 | 0 | 38 | 0 |

*[1]Water content ratio of honeycomb formed article after the first step

B-1-3. Evaluation:

In the case of subjecting the honeycomb formed article 1 having a water content ratio 37% after the first step under the conditions that a crack is easily caused in the partition walls 2 or the outer peripheral wall 4 of the honeycomb structure 1, by the hot air drying where hot air having a wet-bulb temperature of 50 to 80° C. through the cells 3 of the honeycomb formed article 1 as in Examples 1 to 4, a crack (cut) was completely inhibited from generating in the partition walls 2 or the outer peripheral wall 4 of the honeycomb formed article 1. In contrast, in Comparative Example 1, where hot air having a wet-bulb temperature of 34° C. was employed as a conventional hot air drying, generation of a crack (cut) was frequently caused in the partition walls 2 or the outer peripheral wall 4 of the honeycomb formed article 1 after drying. In addition, in the case of subjecting a honeycomb formed article having a water content ratio of 15% after the first step under the conditions that a deformation is easily caused in the partition walls 2 or the outer peripheral wall 4 of the honeycomb structure 1, by the hot air drying where hot air having a wet-bulb temperature of 60° C. was passed through the cells 3 of the honeycomb formed article 1 as in Examples 5 and 6, a deformation was completely inhibited from generating in the partition walls 2 or the outer peripheral wall 4 of the honeycomb formed article 1. In contrast, in Comparative Example 2, where hot air having a wet-bulb temperature of 34° C. as a conventional hot air drying, generation of a deformation was frequently caused in the partition walls 2 or the outer peripheral wall 4 of the honeycomb formed article 1 after drying. From the above, it was shown that a defect such as a deformation and breakage is inhibited from generating by a drying method of the present invention, where the wet-bulb temperature of the hot air passed through the cells of the honeycomb formed article is controlled to 50 to 100° C. in the hot air drying of the second step. Further, when the dry-bulb temperature of the hot air sent in the hot air drying is 100 to 200° C., combustion of the binder contained in the honeycomb formed article was inhibited.

B-2. Consideration on Properties of Honeycomb Formed Articles and Water Content Ratio of Each Honeycomb Formed Article After the First Step B-2-1. Drying of Honeycomb Formed Article:

Example 7

A cylindrical honeycomb formed article 1 (FIG. 2) having the diameter D, cross sectional opening area ratio A, dielectric constant $\in$, and dielectric loss $\delta$ shown in Table 3 was subjected to the first step of microwave drying where electromagnetic waves having an oscillation frequency of 2450 MHz was irradiated for eight minutes with a half-power depth (L) of 0.025 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 3.2 (<5). In the first step, the honeycomb formed article 1 was dried until the water content ratio of the honeycomb formed article after the first step became 60%. The central portion of the honeycomb formed article after the first step was 100° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

TABLE 3

| | Honeycomb formed article | | | | First step (microwave drying) | | | | |
|---|---|---|---|---|---|---|---|---|---|
| | Diameter D (mm) | Opening area ratio A*1 | Dielectric constant ε | Dielectric loss tanδ | Oscillation frequency f (MHz) | Half power depth L*2 (mm) | $[(D/2) \times (1-A)^{1/2}]/L$ | Water content ratio*3 (%) | Temp. in center*4 (° C.) |
| Example 17 | 286 | 0.69 | 16.0 | 0.14 | 2450 | 25 | 3.2 | 60 | 100 |
| Example 18 | 286 | 0.63 | 28.6 | 0.20 | 2450 | 13 | 6.9 | 60 | 100 |
| Example 19 | 350 | 0.63 | 28.6 | 0.20 | 2450 | 13 | 8.5 | 60 | 95 |
| Example 20 | 350 | 0.63 | 32.7 | 0.25 | 2450 | 9.5 | 11.2 | 60 | 30 |
| Example 21 | 430 | 0.63 | 32.7 | 0.25 | 2450 | 9.5 | 13.8 | 60 | 25 |
| Example 22 | 286 | 0.69 | 16.0 | 0.14 | 2450 | 25 | 3.2 | 80 | 100 |
| Example 23 | 286 | 0.63 | 28.6 | 0.20 | 2450 | 13 | 6.9 | 80 | 60 |
| Example 24 | 350 | 0.63 | 28.6 | 0.20 | 2450 | 13 | 8.5 | 80 | 40 |
| Example 25 | 350 | 0.63 | 32.7 | 0.25 | 2450 | 9.5 | 11.2 | 80 | 25 |
| Example 26 | 430 | 0.63 | 32.7 | 0.25 | 2450 | 9.5 | 13.8 | 80 | 25 |

| | Second step (hot air drying) | | Evaluation | |
|---|---|---|---|---|
| | Dry-bulb temp. (° C.) | Wet-bulb temp. (° C.) | Crack | Cell deformation |
| Example 7 | 120 | 50 | None | None |
| Example 8 | 120 | 50 | None | None |
| Example 9 | 120 | 50 | None | None |
| Example 10 | 120 | 50 | Present | None |
| Example 11 | 120 | 50 | Present | None |
| Example 12 | 120 | 50 | None | None |
| Example 13 | 120 | 50 | None | None |
| Example 14 | 120 | 50 | None | Present |
| Example 15 | 120 | 50 | Present | None |
| Example 16 | 120 | 50 | Present | None |

*1cross sectional opening area ratio of honeycomb formed article
*2half electromagnetic wave depth
*3Water content ratio of honeycomb formed article after the first step
*4Temperature in central portion of honeycomb formed article after the first step

Example 8

A cylindrical honeycomb formed article 1 (FIG. 2) having the diameter D, cross sectional opening area ratio A, dielectric constant ε, and dielectric loss δ shown in Table 3 was subjected to the first step of microwave drying where electromagnetic waves having an oscillation frequency of 2450 MHz was irradiated for eight minutes with a half power depth (L) of 0.013 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 9 (<10). In the first step, the honeycomb formed article 1 was dried until the water content ratio of the honeycomb formed article after the first step became 60%. The central portion of the honeycomb formed article after the first step had a temperature of 100° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 9

A cylindrical honeycomb formed article 1 (FIG. 2) having the diameter D, cross sectional opening area ratio A, dielectric constant ε, and dielectric loss δ shown in Table 3 was subjected to the first step of microwave drying where electromagnetic waves having an oscillation frequency of 2450 MHz was irradiated for eight minutes with a half power depth (L) of 0.013 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 8.5 (<10). In the first step, the honeycomb formed article 1 was dried until the water content ratio of the honeycomb formed article after the first step became 60%. The central portion of the honeycomb formed article after the first step had a temperature of 95° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 10

A cylindrical honeycomb formed article 1 (FIG. 2) having the diameter D, cross sectional opening area ratio A, dielectric constant ε, and dielectric loss δ shown in Table 3 was subjected to the first step of microwave drying where electromagnetic waves having an oscillation frequency of 2450 MHz was irradiated for eight minutes with a half power depth (L) of 0.0095 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 11.2 (>10). In the first step, the honeycomb formed article 1 was dried until the water content ratio of the honeycomb formed article after the first step became 60%.

The central portion of the honeycomb formed article after the first step had a temperature of 30° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 11

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.0095 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 13.8 (>10). In the first step, the honeycomb formed article 1 was dried until the water content ratio of the honeycomb formed article after the first step became 60%. The central portion of the honeycomb formed article after the first step had a temperature of 25° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 12

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.025 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 3.2 (<5). In the first step, the honeycomb formed article 1 was dried until the water content ratio of the honeycomb formed article after the first step became 80%. The central portion of the honeycomb formed article after the first step had a temperature of 100° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 13

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.013 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 6.9 (<10). In the first step, the honeycomb formed article 1 was dried until the water content ratio of the honeycomb formed article after the first step became 80%. The central portion of the honeycomb formed article after the first step had a temperature of 60° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 14

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.013 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 8.5 (<10). In the first step, the honeycomb formed article 1 was dried until the water content ratio of the honeycomb formed article after the first step became 80%. The central portion of the honeycomb formed article after the first step had a temperature of 40° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 15

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.0095 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 11.2 (>10). In the first step, the honeycomb formed article 1 was dried until the water content ratio of the honeycomb formed article after the first step became 80%. The central portion of the honeycomb formed article after the first step had a temperature of 25° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 16

A cylindrical honeycomb formed article 1 (FIG. 2) having the diameter D, cross sectional opening area ratio A, dielectric constant ∈, and dielectric loss δ shown in Table 3 was subjected to the first step of microwave drying where electromagnetic waves having an oscillation frequency of 2450 MHz was irradiated for eight minutes with a half power depth (L) of 0.0095 m with respect to the electromagnetic waves in an atmosphere having a dry-bulb temperature of 60° C. and a wet-bulb temperature of 60° C. in the drying furnace. Incidentally, the value on the left-hand side of the aforementioned formula (I) was 13.8 (>10). In the first step, the honeycomb formed article 1 was dried until the water content ratio of the honeycomb formed article after the first step became 80%. The central portion of the honeycomb formed article after the first step had a temperature of 25° C. Next, the honeycomb formed article 1 was dried until the water content ratio became below 1% in the second step by hot air drying where the hot air having a dry-bulb temperature of 120° C. and a wet-bulb temperature of 50° C. was passed through the cells 3 of the honeycomb formed article 1.

Example 17

A honeycomb formed article 1 was dried in the same manner as in Example 7 except that the hot air sent in the hot air drying of the second step had a wet-bulb temperature of 80° C. (Table 4).

TABLE 4

| | Honeycomb formed article | | | | First step (microwave drying) | | | | |
|---|---|---|---|---|---|---|---|---|---|
| | Diameter D (mm) | Opening area ratio A*1 | Dielectric constant ϵ | Dielectric loss tanδ | Oscillation frequency f (MHz) | Half power depth L*2 (mm) | [(D/2) × (1 − A)$^{1/2}$]/L | Water content ratio*3 (%) | Temp. in center*4 (° C.) |
| Example 17 | 286 | 0.69 | 16.0 | 0.14 | 2450 | 25 | 3.2 | 60 | 100 |
| Example 18 | 286 | 0.63 | 28.6 | 0.20 | 2450 | 13 | 6.9 | 60 | 100 |
| Example 19 | 350 | 0.63 | 28.6 | 0.20 | 2450 | 13 | 8.5 | 60 | 95 |
| Example 20 | 350 | 0.63 | 32.7 | 0.25 | 2450 | 9.5 | 11.2 | 60 | 30 |
| Example 21 | 430 | 0.63 | 32.7 | 0.25 | 2450 | 9.5 | 13.8 | 60 | 25 |
| Example 22 | 286 | 0.69 | 16.0 | 0.14 | 2450 | 25 | 3.2 | 80 | 100 |
| Example 23 | 286 | 0.63 | 28.6 | 0.20 | 2450 | 13 | 6.9 | 80 | 60 |
| Example 24 | 350 | 0.63 | 28.6 | 0.20 | 2450 | 13 | 8.5 | 80 | 40 |
| Example 25 | 350 | 0.63 | 32.7 | 0.25 | 2450 | 9.5 | 11.2 | 80 | 25 |
| Example 26 | 430 | 0.63 | 32.7 | 0.25 | 2450 | 9.5 | 13.8 | 80 | 25 |

| | Second step (hot air drying) | | Evaluation | |
|---|---|---|---|---|
| | Dry-bulb temp. (° C.) | Wet-bulb temp. (° C.) | Crack | Cell deformation |
| Example 17 | 120 | 80 | None | None |
| Example 18 | 120 | 80 | None | None |
| Example 19 | 120 | 80 | None | None |
| Example 20 | 120 | 80 | Present | None |
| Example 21 | 120 | 80 | Present | None |
| Example 22 | 120 | 80 | None | None |
| Example 23 | 120 | 80 | None | Present |
| Example 24 | 120 | 80 | None | Present |
| Example 25 | 120 | 80 | Present | None |
| Example 26 | 120 | 80 | Present | None |

*1cross sectional opening area ratio of honeycomb formed article

*2half electromagnetic wave depth

*3Water content ratio of honeycomb formed article after the first step

*4Temperature in central portion of honeycomb formed article after the first step

Example 18

The honeycomb formed article 1 was dried in the same manner as in Example 8 except that the hot air sent in the hot air drying in the second step had a wet-bulb temperature of 80° C. (Table 4).

Example 19

The honeycomb formed article 1 was dried in the same manner as in Example 9 except that the hot air sent in the hot air drying in the second step had a wet-bulb temperature of 80° C. (Table 4).

Example 20

The honeycomb formed article 1 was dried in the same manner as in Example 10 except that the hot air sent in the hot air drying in the second step had a wet-bulb temperature of 80° C. (Table 4).

Example 21

The honeycomb formed article 1 was dried in the same manner as in Example 11 except that the hot air sent in the hot air drying in the second step had a wet-bulb temperature of 80° C. (Table 4).

Example 22

The honeycomb formed article 1 was dried in the same manner as in Example 12 except that the hot air sent in the hot air drying in the second step had a wet-bulb temperature of 80° C. (Table 4).

Example 23

The honeycomb formed article 1 was dried in the same manner as in Example 13 except that the hot air sent in the hot air drying in the second step had a wet-bulb temperature of 80° C. (Table 4).

Example 24

The honeycomb formed article 1 was dried in the same manner as in Example 14 except that the hot air sent in the hot air drying in the second step had a wet-bulb temperature of 80° C. (Table 4).

Example 25

The honeycomb formed article 1 was dried in the same manner as in Example 15 except that the hot air sent in the hot air drying in the second step had a wet-bulb temperature of 80° C. (Table 4).

Example 26

The honeycomb formed article 1 was dried in the same manner as in Example 16 except that the hot air sent in the hot air drying in the second step had a wet-bulb temperature of 80° C. (Table 4).

B-2-2. Results:

Tables 3 and 4 show results of visual inspection on a crack (cut) of the partition walls 2 and the outer peripheral wall 4 and generation of a cell deformation regarding the honeycomb formed articles 1 dried in Examples 7 to 26.

B-2-3. Evaluation:

Evaluations on the values on the left-hand side of the aforementioned formula (I) were given with respect to each of the group constituted of Examples 7 to 16, where the hot air sent in the hot air drying of the second step had a wet-bulb temperature of 50° C., and the group constituted of Examples 17 to 26, where the hot air sent in the hot air drying of the second step had a wet-bulb temperature of 80° C. In each of the groups, it was shown that, the smaller the value on the left-hand side is, the higher the temperature in the central portion of the honeycomb formed article after the first step, and the better drying state can be set in the subsequent second step. Therefore, it was shown that, the smaller the value on the left-hand side is, the more the generation of the crack (cut) and the deformation in the partition walls 2 and the outer peripheral wall 4 of the honeycomb formed article 1 is reduced. In the Examples 7 to 16, where the honeycomb formed article after the first step has a water content ratio of 60%, it was shown that the generation of the crack (cut) and the deformation in the partition walls 2 and the outer peripheral wall 4 of the honeycomb formed article 1 was reduced in comparison with Example 12 to 16, where the water content ratio was 80% as a contrast. The same tendency was shown between the Examples 17 to 21 and the Examples 22 to 26.

When control examples between the groups constituted of Examples 7 to 16, where the hot air sent in the hot air drying of the second step had a wet-bulb temperature of 50° C., and the group constituted of Examples 17 to 26, where the wet-bulb temperature was 80° C., are compared, it is understood that generation of the crack (cut) and the deformation in the partition walls 2 and the outer peripheral wall 4 of the honeycomb formed article 1 can be reduced more in the group of Examples having a wet-dry temperature of 50° C. of the hot air sent in the hot air drying of the step 2 than in the group of Examples having a wet-dry temperature of 80° C. In particular, when Examples 13 and 23 under the same conditions of the hot air sent in the hot air drying in the step 2 except for the wet-bulb drying are compared with each other, a cell deformation of the honeycomb formed article was generated in Example 13, while no cell deformation was generated in Example 23. It can be speculated that the contrastive results were caused from the fact that, when the temperature of the central portion of the honeycomb formed article 1 after the first step is lower than the wet-bulb temperature of the hot air sent in the hot air drying as Example 13, a dew is formed on the partition wall 2 because the hot air is cooled down to the dew-point temperature or less in the mid-flow of the hot air passing through the cells 3. It can be considered that, due to the dew formation, drying unevenness is caused in the honeycomb formed article 1, which may result in a cell deformation.

B-3. Consideration on Atmosphere in Preheating and in Drying Furnace in the First Step:

B-3-1. Drying of Honeycomb Formed Article:

Example 27

A cylindrical honeycomb formed article 1 (FIG. 2) having the diameter D, cross sectional opening area ratio A, dielectric constant $\in$, and dielectric loss $\delta$ shown in Table 5 was subjected to the preliminary heating step where heating was performed for two minutes in an atmosphere of a dry-bulb temperature of 60° C. and a wet-bulb temperature of 60° C. and the subsequent first step of microwave drying where electromagnetic waves having an oscillation frequency of 2450 MHz was irradiated for eight minutes with a half power depth (L) of 0.0025 m with respect to the electromagnetic waves. In the first step, the honeycomb formed article 1 was dried until the water content ratio of the honeycomb formed article after the first step became 5%. Next, the honeycomb formed article 1 was dried in the second step by hot air drying where the hot air having a dry-bulb temperature of 120° C. and a wet-bulb temperature of 60° C. was passed through the cells 3 of the honeycomb formed article 1.

time with inhibiting generation of a defect such as a deformation and breakage.

The present invention can be used as a method for drying a honeycomb formed article, the method being capable of drying a honeycomb formed article in a shorter period of time with inhibiting generation of a defect such as a deformation and breakage.

TABLE 5

| | Honeycomb formed article | | | | Preliminary heating step | | |
|---|---|---|---|---|---|---|---|
| | Diameter D (mm) | Opening area ratio A*[1] | Dielectric constant ε | Dielectric loss tanδ | Dry-bulb temp. (° C.) | Wet-bulb temp. (° C.) | Heating time (min.) |
| Example 27 | 286 | 0.69 | 16.0 | 0.14 | 60 | 60 | 2 |
| Example 28 | 286 | 0.69 | 16.0 | 0.14 | 60 | 35 | 2 |
| Example 29 | 286 | 0.69 | 16.0 | 0.14 | 60 | 60 | 2 |

| | First step (microwave drying) | | | | | | Second step (hot air drying) | | |
|---|---|---|---|---|---|---|---|---|---|
| | Oscillation frequency f (MHz) | Half depth L*[2] (mm) | $[(D/2) \times (1 - A)^{1/2}]/L$ | Dry-bulb temp. (° C.) | Wet-bulb temp. (° C.) | Heating time (min.) | Dry-bulb temp. (° C.) | Wet-bulb temp. (° C.) | Evaluation Cell deformation |
| Example 27 | 2450 | 25 | 3.2 | 60 | 60 | 8 | 120 | 60 | None |
| Example 28 | 2450 | 25 | 3.2 | 60 | 60 | 8 | 120 | 60 | Present |
| Example 29 | 2450 | 25 | 3.2 | 60 | 35 | 8 | 120 | 60 | Present |

*[1]cross sectional opening area ratio of honeycomb formed article
*[2]Half electromagnetic wave depth Example 28

The honeycomb formed article was dried in the same manner as in Example 28 except that the atmosphere in the preliminary heating step had a wet-bulb temperature of 35° C. (Table 5)

Example 29

A honeycomb formed article was dried in the same manner as in Example 27 except that the atmosphere in the drying furnace in the first step has a wet-bulb temperature of 35° C. (Table 5).

B-3-2. Results:

As results of visual inspection on a crack (cut) of the partition walls 2 and the outer peripheral wall 4 and generation of a cell deformation regarding the honeycomb formed articles 1 dried in Examples 27 to 29, no crack (cut) and no deformation was observed in the partition walls 2 and the outer peripheral wall 4 in Example 27, while a crack (cut) or a deformation was observed in the partition walls 2 and the outer peripheral wall 4 in Examples 28 and 29 (Table 5).

B-3-3. Evaluation:

As the aforementioned results of Examples 27 to 29, it was understood that, when the atmosphere where a honeycomb formed article is subjected in the preliminary heating step and the first drying step has a wet-bulb temperature of 50° C. or more, crack (cut) generation and deformation generation in the partition walls 2 and the outer peripheral walls 4 can be inhibited.

As a comprehensive evaluation on the aforementioned Examples, it has been experimentally proved that a method for drying a honeycomb formed article of the present invention can dry a honeycomb formed article in a shorter period of

What is claimed is:

1. A method for drying an unfired honeycomb formed article having a plurality of cells separated by partition walls made from raw material composition containing a ceramic raw material, water, and a binder; the method comprising:
   a first step in which the honeycomb formed article is heated and dried by microwave drying or dielectric drying, and
   a second step in which the honeycomb formed article is dried by hot air drying comprising passing hot air having a dry-bulb temperature of 100 to 200° C. through the honeycomb formed article, the second step further comprising adjusting the humidity of the hot air to have a wet-bulb temperature of 50 to 100° C.

2. The method for drying a honeycomb formed article according to claim 1, wherein the binder contained in the raw material composition has a heat gelation property and/or a thermosetting property.

3. The method for drying a honeycomb formed article according to claim 1, the raw material composition has a binder content of 1 to 10 mass %.

4. The method for drying a honeycomb formed article according to claim 2, the raw material composition has a binder content of 1 to 10 mass %.

5. The method for drying a honeycomb formed article according to claim 1, wherein, in the first step, the honeycomb formed article is dried so that the honeycomb formed article after the first step has a water content ratio of 5 to 60% to the honeycomb formed article right after formation, and the honeycomb formed article is dried by evaporating residual water in the second step.

6. The method for drying a honeycomb formed article according to claim 1, wherein, in the first step, in the case of using the microwave drying, the honeycomb formed article is dried by irradiating electromagnetic waves having an oscillation frequency of 300 to 10000 MHz, and, in the case of using the dielectric drying, the honeycomb formed article is dried by applying a high-frequency current having an oscillation frequency of 3 to 100 MHz.

7. The method for drying a honeycomb formed article according to claim 5, wherein, in the first step, in the case of using the microwave drying, the honeycomb formed article is dried by irradiating electromagnetic waves having an oscillation frequency of 300 to 10000 MHz, and, in the case of using the dielectric drying, the honeycomb formed article is dried by applying a high-frequency current having an oscillation frequency of 3 to 100 MHz.

8. The method for drying a honeycomb formed article according to claim 1, wherein the honeycomb formed article having a size and a dielectric property satisfying the following formula (I) is dried by the microwave drying by irradiating the electromagnetic waves having an oscillation frequency satisfying the following formula (I) or the dielectric drying by applying the high-frequency current having an oscillation frequency satisfying the following formula (I) in the step 1:

[Formula 1]

$$[(D/2)\times(1-A)^{1/2}]/L<10 \qquad (I)$$

(where D denotes a diameter (m) of the honeycomb formed article, A denotes a cross sectional opening area ratio of the honeycomb formed article, and L denotes a half power depth (m)).

9. The method for drying a honeycomb formed article according to claim 5, wherein the honeycomb formed article having a size and a dielectric property satisfying the following formula (I) is dried by the microwave drying by irradiating the electromagnetic waves having an oscillation frequency satisfying the following formula (I) or the dielectric drying by applying the high-frequency current having an oscillation frequency satisfying the following formula (I) in the step 1:

[Formula 1]

$$[(D/2)\times(1-A)^{1/2}]/L<10 \qquad (I)$$

(where D denotes a diameter (m) of the honeycomb formed article, A denotes a cross sectional opening area ratio of the honeycomb formed article, and L denotes a half power depth (m)).

10. The method for drying a honeycomb formed article according to claim 6, wherein the honeycomb formed article having a size and a dielectric property satisfying the following formula (I) is dried by the microwave drying by irradiating the electromagnetic waves having an oscillation frequency satisfying the following formula (I) or the dielectric drying by applying the high-frequency current having an oscillation frequency satisfying the following formula (I) in the step 1:

[Formula 1]

$$[(D/2)\times(1-A)^{1/2}]/L<10 \qquad (I)$$

(where D denotes a diameter (m) of the honeycomb formed article, A denotes a cross sectional opening area ratio of the honeycomb formed article, and L denotes a half power depth (m)).

11. The method for drying a honeycomb formed article according to claim 7, wherein the honeycomb formed article having a size and a dielectric property satisfying the following formula (I) is dried by the microwave drying by irradiating the electromagnetic waves having an oscillation frequency satisfying the following formula (I) or the dielectric drying by applying the high-frequency current having an oscillation frequency satisfying the following formula (I) in the step 1:

[Formula 1]

$$[(D/2)\times(1-A)^{1/2}]/L<10 \qquad (I)$$

(where D denotes a diameter (m) of the honeycomb formed article, A denotes a cross sectional opening area ratio of the honeycomb formed article, and L denotes a half power depth (m)).

12. The method for drying a honeycomb formed article according to claim 1, wherein the honeycomb formed article is dried by the microwave drying or the dielectric drying with introducing superheated steam or a mixed gas of steam and heated air into a drying furnace so that an atmosphere in the drying furnace has a wet-bulb temperature of 50 to 100° C. in the first step.

13. The method for drying a honeycomb formed article according to claim 5, wherein the honeycomb formed article is dried by the microwave drying or the dielectric drying with introducing superheated steam or a mixed gas of steam and heated air into a drying furnace so that an atmosphere in the drying furnace has a wet-bulb temperature of 50 to 100° C. in the first step.

14. The method for drying a honeycomb formed article according to claim 1, wherein the method has a preliminary heating step for heating the honeycomb formed article in an atmosphere having a wet-bulb temperature of 50 to 100° C. before the first step.

15. The method for drying a honeycomb formed article according to claim 5, wherein the method has a preliminary heating step for heating the honeycomb formed article in an atmosphere having a wet-bulb temperature of 50 to 100° C. before the first step.

16. The method for drying a honeycomb formed article according to claim 14, wherein the method has a preliminary heating step for heating the honeycomb formed article in an atmosphere having a wet-bulb temperature of 50 to 100° C. before the first step.

* * * * *